United States Patent
Abe

(10) Patent No.: US 11,298,940 B2
(45) Date of Patent: Apr. 12, 2022

(54) LIQUID DISCHARGE APPARATUS, LIQUID DISCHARGE METHOD, AND STORAGE MEDIUM

(71) Applicant: Kimito Abe, Kanagawa (JP)

(72) Inventor: Kimito Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/116,883

(22) Filed: Dec. 9, 2020

(65) Prior Publication Data
US 2021/0178755 A1     Jun. 17, 2021

(30) Foreign Application Priority Data
Dec. 13, 2019  (JP) .............. JP2019-225533

(51) Int. Cl.
*B41J 2/21*       (2006.01)
*G06K 15/10*      (2006.01)
*B41J 2/045*      (2006.01)

(52) U.S. Cl.
CPC .......... *B41J 2/0456* (2013.01); *B41J 2/2121* (2013.01); *G06K 15/107* (2013.01); *B41J 2/2132* (2013.01)

(58) Field of Classification Search
CPC ...... B41J 2/0456; B41J 2/2121; B41J 2/2132; G06K 15/107
See application file for complete search history.

(56) References Cited

U.S. PATENT DOCUMENTS

| 6,053,596 A | 4/2000 | Nakano et al. |
| 2012/0194590 A1* | 8/2012 | Suzuki ............. B41J 29/38 347/14 |
| 2014/0292861 A1* | 10/2014 | Tanase ............. B41J 2/2121 347/13 |
| 2020/0290343 A1 | 9/2020 | Abe |

FOREIGN PATENT DOCUMENTS

| JP | 9-277509 | 10/1997 |
| JP | 2011-004173 | 1/2011 |
| JP | 2011-201207 | 10/2011 |
| JP | 2017-035814 | 2/2017 |

* cited by examiner

*Primary Examiner* — Yaovi M Ameh
(74) *Attorney, Agent, or Firm* — Duft & Bornsen, PC

(57) ABSTRACT

A liquid discharge apparatus includes a liquid discharge head, a scanning device, a storage device, and circuitry. The liquid discharge head discharges liquid from a plurality of nozzles onto a recording medium. The scanning device moves at least one of the recording medium and the liquid discharge head to perform scanning. The storage device stores a plurality of mask patterns to change a discharge amount and a discharge size of the liquid from the liquid discharge head. The circuitry acquires image data, creates dot data from the image data, and determines the discharge size of the liquid to be discharged from the liquid discharge head, based on the dot data and one of the plurality of mask patterns.

6 Claims, 12 Drawing Sheets

FIG. 15

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2019-225533, filed on Dec. 13, 2019, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing program code.

Related Art

When an inkjet type liquid discharge apparatus (inkjet recording apparatus) performs multi-scan printing, it is known to use a plurality of masks for selective discharge for dot data after halftone processing, to create data for each scan. In mask processing, a mask is used as overlap processing in which some of discharge dots of the same color in an image formed by actual printing are overlapped with each other, void processing in which dots are not formed regardless of the presence or absence of dot data, or combination processing of the overlap processing and the void processing. Such a technique can restrain image defects such as banding and streaks due to landing position deviation of dots and increase the adhesion amount of ink to be equal to or greater than the number of dots of data.

Such a dot mask processing technique is a selective discharge processing in which the overlapping ratio differs according to the droplet type of ink, and dot data is created for each droplet size, and a selective discharge processing in which the overlapping ratio differs according to the droplet type is performed. Another dot mask processing technique is selective discharge processing in which the overlapping ratio differs depending on the gradation. Density data is created at the same time as when dot data is created, and selective discharge processing in which the overlapping ratio differs depending on the density data is performed. Selective discharge processing that differs depending on the gradation is performed.

SUMMARY

According to an aspect of the present disclosure, there is provided a liquid discharge apparatus that includes a liquid discharge head, a scanning device, a storage device, and circuitry. The liquid discharge head discharges liquid from a plurality of nozzles onto a recording medium. The scanning device moves at least one of the recording medium and the liquid discharge head to perform scanning. The storage device stores a plurality of mask patterns to change a discharge amount and a discharge size of the liquid from the liquid discharge head. The circuitry acquires image data, creates dot data from the image data, and determines the discharge size of the liquid to be discharged from the liquid discharge head, based on the dot data and one of the plurality of mask patterns.

According to another aspect of the present disclosure, there is provided a liquid discharge method that includes moving, acquiring, creating, selecting, and determining. The moving moves at least one of a recording medium and a liquid discharge head to perform scanning. The acquiring acquires image data. The creating creates dot data from the image data. The selecting selects one of a first mask pattern for discharging no liquid from the liquid discharge head based on the dot data, a second mask pattern for discharging the liquid without changing a discharge size of the liquid from the liquid discharge head, and a third mask pattern for discharging the liquid with changing the discharge size of the liquid from the liquid discharge head. The determining determines the discharge size of the liquid to be discharged from the liquid discharge head based on the dot data and the one of the first mask pattern, the second mask pattern, and the third mask pattern selected by the selecting.

According to still another aspect of the present disclosure, there is provided a non-transitory storage medium storing computer-readable program code for causing a liquid discharge apparatus to execute moving, acquiring, creating, selecting, and determining. The moving moves at least one of a recording medium and a liquid discharge head to perform scanning. The acquiring acquires image data. The creating creates dot data from the image data. The selecting selects one of a first mask pattern for discharging no liquid from the liquid discharge head based on the dot data, a second mask pattern for discharging the liquid without changing a discharge size of the liquid from the liquid discharge head, and a third mask pattern for discharging the liquid with changing the discharge size of the liquid from the liquid discharge head. The determining determines the discharge size of the liquid to be discharged from the liquid discharge head based on the dot data and the one of the first mask pattern, the second mask pattern, and the third mask pattern selected by the selecting.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 15 is a diagram illustrating specific overlap void processing according to the first embodiment.

Figure 1:
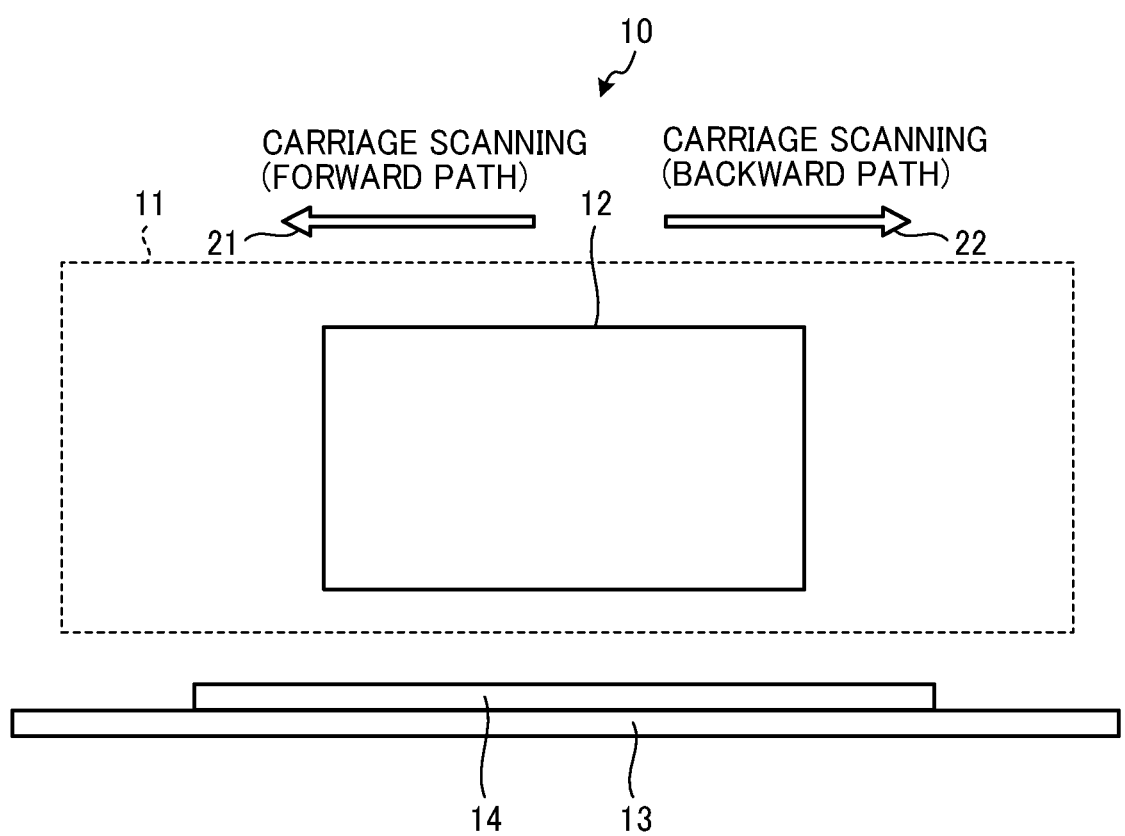
FIG. 1 is a diagram illustrating an example of a schematic configuration of an inkjet recording apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, a liquid discharge apparatus, a liquid discharge method, and a storage medium storing program code according to embodiments of the present disclosure are described in detail with reference to the drawings. In addition, embodiments of the present disclosure are not limited by the following embodiments, and components in the following embodiments include components that can be easily conceived by a person skilled in the art, components that are substantially the same, and components within a so-called equivalent range. Furthermore, various omissions, substitutions, changes, and combinations of components may be made without departing from the scope of the following embodiments.

First Embodiment

An inkjet recording apparatus that is an example of the liquid discharge apparatus according to a first embodiment includes a head unit (liquid discharge head) to discharge dye inks of four colors of black (K), cyan (C), magenta (M), and yellow (Y). Instead of the dye ink, water-based pigment ink, UV-curable ink, or the like may be discharged. The head unit is moved forward and backward in a direction (main scanning direction) perpendicular to a conveyance direction (sub-scanning direction) of a recording medium to form an image. In other words, the inkjet recording apparatus according to the first embodiment forms an image with pigment ink and dye ink, at least one of which contains a specific color (black (K)). In the present embodiment, the specific color is a color belonging to black (K) including gray. Note that the specific color is not limited to black (K) and may be any other color.

Schematic Configuration of Inkjet Recording Apparatus

FIG. 1 is a diagram illustrating an example of a schematic configuration of an inkjet recording apparatus according to an embodiment of the present disclosure. A schematic configuration of an inkjet recording apparatus 10 according to the present embodiment is described with reference to FIG. 1.

As illustrated in FIG. 1, an inkjet recording apparatus 10, which is an example of a liquid discharge apparatus, is a serial-type inkjet printer to execute multi-pass printing in which scanning is performed with the head unit 12 a plurality of times in the main scanning direction to perform printing. The inkjet recording apparatus 10 includes a carriage 11 and a conveyance stage 13. The carriage 11 reciprocates (in other words, performs bidirectional scanning) in a forward direction 21 and a backward direction 22 (along the main scanning direction). The conveyance stage 13 serves as a scanning device to convey a recording medium 14. The scanning unit may scan the recording medium 14 in the main scanning direction and the sub-scanning direction without moving the head unit 12 or may move the head unit 12 in the main scanning direction and the sub-scanning direction to scan the recording medium 14 without moving the recording medium 14.

The head unit 12 includes a plurality of discharge heads to discharge ink droplets and is mounted on the carriage 11. The carriage 11 scans in a direction (main scanning direction) orthogonal to the conveyance direction (sub-scanning direction) of the recording medium 14 to form an image. The recording medium 14 is not limited to a sheet of paper.

The head unit 12 includes one or a plurality of discharge heads that discharge ink droplets onto the recording medium 14 to form an image. Note that one discharge head may discharge ink droplets from a plurality of nozzle rows. As the discharge head included in the head unit 12, for example, a discharge head can be used that has a pressure generating function such as a piezoelectric element to generate pressure for discharging ink droplets.

A conveyance stage 13 is disposed below the movement region of the carriage 11 and conveys the recording medium 14 placed thereon in the sub-scanning direction. The recording medium 14 placed on the conveyance stage 13 is conveyed in the sub-scanning direction by the conveyance stage 13, and an image is formed by the head unit 12. In other words, the inkjet recording apparatus 10 moves the carriage 11 and discharges ink droplets from the head unit 12 onto the recording medium 14 to form a desired image onto the recording medium 14.

Hardware Configuration of Inkjet Recording Apparatus

Figure 2:
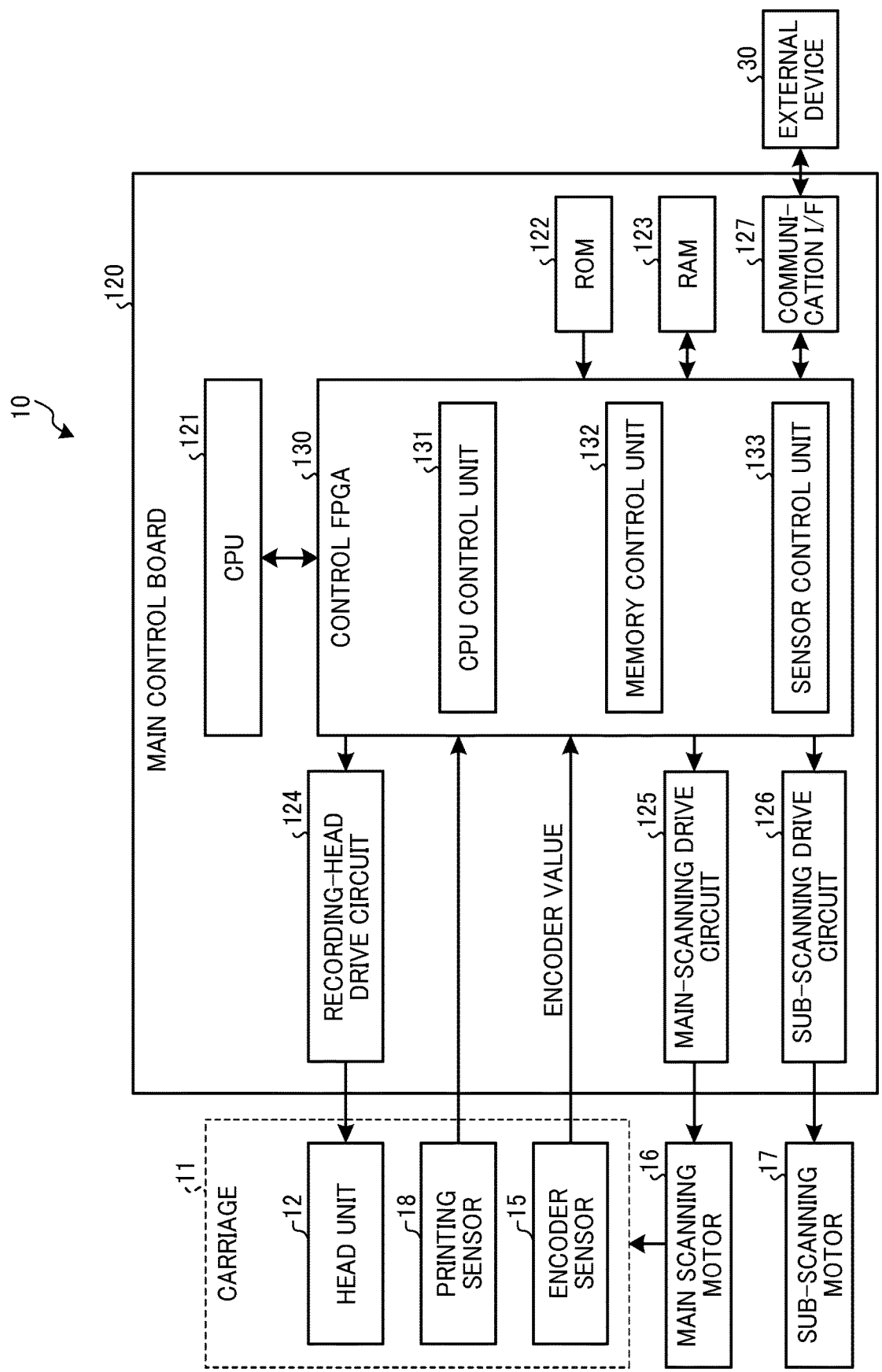
FIG. 2 is a diagram an example of a hardware configuration of the inkjet recording apparatus according to the first embodiment of the present disclosure.

FIG. 2 is a diagram illustrating an example of a hardware configuration of an inkjet recording apparatus according to an embodiment of the present disclosure. A hardware configuration of the inkjet recording apparatus 10 according to the present embodiment is described with reference to FIG. 2.

As illustrated in FIG. 2, the inkjet recording apparatus 10 includes a main control board 120, a carriage 11, a main scanning motor 16, and a sub-scanning motor 17.

The main control board 120 is a board that controls operations of various devices in the inkjet recording apparatus 10. The main control board 120 includes a central processing unit (CPU) 121, a read only memory (ROM) 122, a random access memory (RAM) 123, a recording-head drive circuit 124, a main-scanning drive circuit 125, a sub-scanning drive circuit 126, a communication interface (I/F) 127, and a control field-programmable gate array (FPGA) 130.

The carriage 11 is a moving body that moves on the recording medium 14 in the main scanning direction and discharges ink droplets from the head unit 12 to form an image on the recording medium 14. The carriage 11 includes a head unit 12, an encoder sensor 15, and a printing sensor 18.

The CPU 121 denotes an arithmetic unit to control the entire inkjet recording apparatus 10. For example, the CPU 121 uses the RAM 123 as a working area to execute various control programs stored in the ROM 122, and outputs a control command for controlling various operations in the inkjet recording apparatus 10.

The recording-head drive circuit 124 is a drive circuit that drives the head unit 12 to perform a discharge operation. The main-scanning drive circuit 125 is a drive circuit that drive and rotate the main scanning motor 16 to move the carriage 11 in the main scanning direction. The sub-scanning drive circuit 126 is a drive circuit that conveys the recording medium 14 on the conveyance stage 13 in the sub-scanning direction.

The communication I/F 127 is an interface for connecting the inkjet recording apparatus 10 to an external device 30 such as a personal computer (PC) to perform data communications. For example, the communication I/F 127 receives, from the external device 30, printing data such as image data for causing the inkjet recording apparatus 10 to form (print) an image. In FIG. 2, the communication I/F 127 of the inkjet recording apparatus 10 is directly connected to the external device 30. However, embodiments of the present disclosure are not limited to such a configuration. For example, the communication I/F 127 may be connected to the external device 30 via a network or may perform data communication with the external device 30 by wireless communication.

The control FPGA 130 is an integral circuit (IC) that controls various operations in the inkjet recording apparatus 10 in cooperation with the CPU 121. The control FPGA 130 includes, for example, a CPU control unit 131, a memory control unit 132, and a sensor control unit 133 as functional components.

The CPU control unit 131 communicates with the CPU 121 to transmit various kinds of data acquired by the control FPGA 130 to the CPU 121 and input a control command output from the CPU 121.

The memory control unit 132 performs memory control for the CPU 121 to access the ROM 122 and the RAM 123.

The sensor control unit 133 performs processing to input an encoder value output from the encoder sensor 15 and image data read by the printing sensor 18.

The head unit 12 is a unit that is driven by the recording-head drive circuit 124 whose operation is controlled by the CPU 121 and the control FPGA 130, and discharges ink droplets onto the recording medium 14 on the conveyance stage 13 to form an image.

The encoder sensor 15 is a sensor that outputs, to the control FPGA 130, an encoder value obtained by detecting a mark of an encoder sheet. The encoder value is passed from the control FPGA 130 to the CPU 121 and used, for example, to calculate the position and velocity of the carriage 11. The CPU 121 generates and outputs a control command for controlling the main scanning motor 16 based on the position and speed of the carriage 11 calculated from the encoder value.

The printing sensor 18 is, for example, a sensor that reads an image printed by the head unit 12 in order to detect the discharge state of each nozzle of the nozzle row.

The hardware configuration of the inkjet recording apparatus 10 illustrated in FIG. 2 is an example and may include components other than the components illustrated in FIG. 2.

Configuration and Operation of Functional Blocks of Inkjet Recording Apparatus

Figure 3:
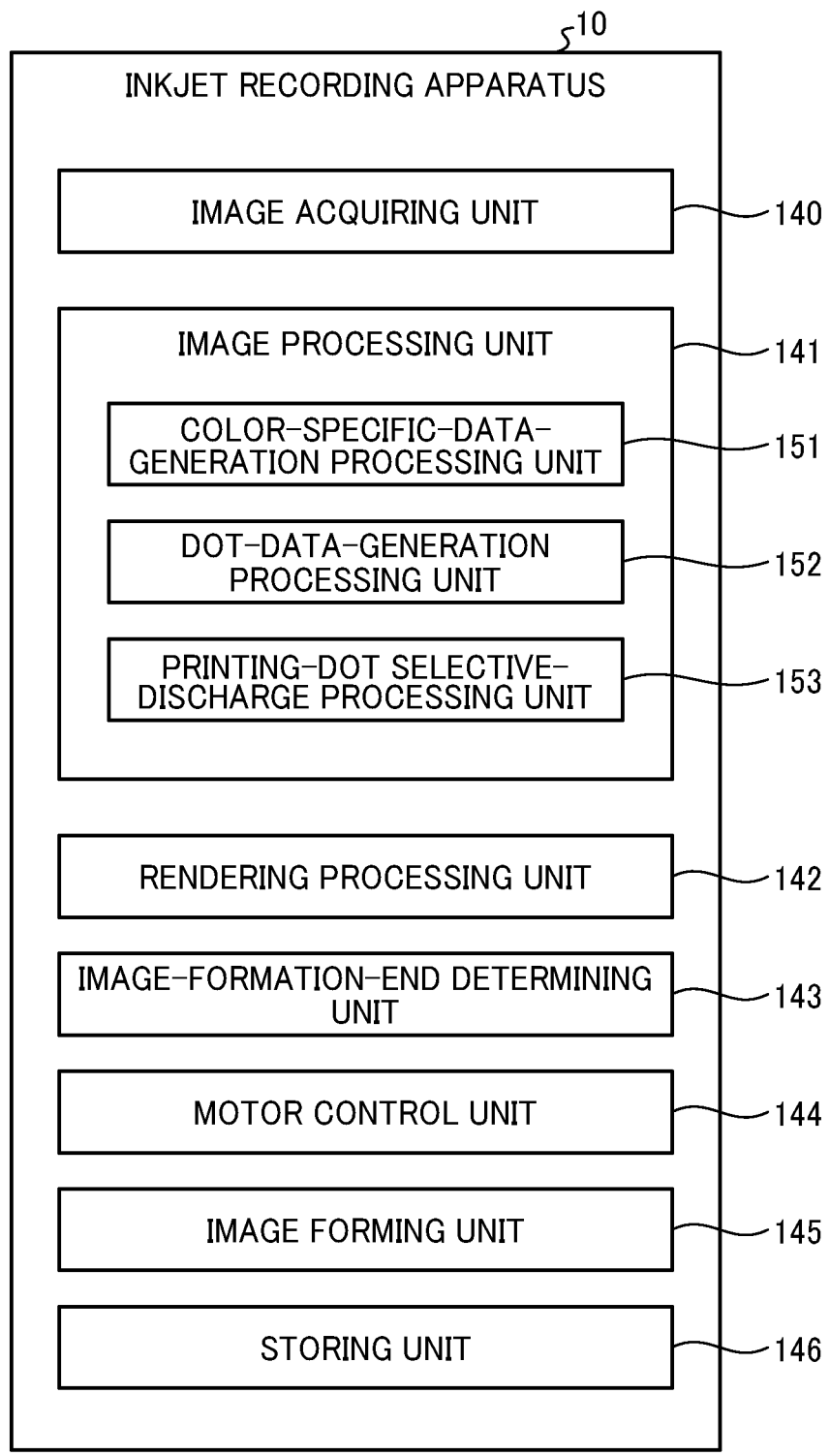
FIG. 3 is a diagram illustrating an example of a configuration of functional blocks of the inkjet recording apparatus according to the first embodiment of the present disclosure.

FIG. 3 is a diagram illustrating an example of a configuration of functional blocks of an inkjet recording apparatus according to a first embodiment of the present disclosure.

As illustrated in FIG. 3, an inkjet recording apparatus 10 according to the present embodiment includes an image acquiring unit 140, an image processing unit 141, a rendering processing unit 142, an image-formation-end determining unit 143, a motor control unit 144, an image forming unit 145, and a storing unit 146.

The image acquiring unit 140 is a functional unit that acquires an image received from the outside (for example, the external device 30 or the like) through the communication I/F 127. The image data acquired by the image acquiring unit 140 includes, for example, color data of three colors of RGB. The image acquiring unit 140 is implemented by the control FPGA 130 illustrated in FIG. 2 or is implemented by execution of a program by the control CPU 121.

The image processing unit 141 is a functional unit that converts the image data (RGB data) acquired by the image acquiring unit 140 into CMYK data handled by the inkjet recording apparatus 10. In addition, the image processing unit 141 performs y correction for reflecting the characteristics of the inkjet recording apparatus 10 and the user's preference. Further, the image processing unit 141 performs halftone processing. Here, the halftone processing is processing of quantizing CMYK gradation data (generally, eight bits for each color) into data (generally, one bit to three bits) that can be handled by the inkjet recording apparatus 10. The image data after the halftone processing becomes dot data. The image processing unit 141 is implemented by the control FPGA 130 illustrated in FIG. 2 or execution of a program by the control CPU 121.

The rendering processing unit 142 is a functional unit that performs rendering processing. Here, the rendering processing is processing of determining how the head unit 12 and the recording medium 14 are to be moved and from which nozzles ink droplets are to be discharged, for dot data for which the halftone processing and non-discharge complementary processing have been completed. The rendering processing unit 142 is implemented by the control FPGA 130 illustrated in FIG. 2 or by execution of a program by the control CPU 121.

The image-formation-end determining unit 143 is a functional unit that determines the end of the printing operation controlled by the image forming unit 145. The image-formation-end determining unit 143 is implemented by the control FPGA 130 illustrated in FIG. 2 or by execution of a program by the control CPU 121.

The motor control unit 144 is a functional unit that controls the operation of the main-scanning drive circuit 125 under the control of the image forming unit 145 to control the main scanning motor 16 driven by the main-scanning drive circuit 125 and control the movement of the carriage 11 in the main scanning direction. The motor control unit 144 controls the operation of the sub-scanning drive circuit 126 under the control of the image forming unit 145 to control the sub-scanning motor 17 driven by the sub-scanning drive circuit 126 and control the conveyance of the recording medium 14 on the conveyance stage 13 in the sub-scanning direction. The motor control unit 144 is implemented by the control FPGA 130 illustrated in FIG. 2 or by execution of a program by the control CPU 121.

The image forming unit 145 is a functional unit that sends dot data subjected to the rendering processing by the rendering processing unit 142 to a printer engine and controls the operation of the recording-head drive circuit 124 to control the discharge timing of ink droplets, the discharge amount of ink droplets, and the like from the head unit 12 driven by the recording-head drive circuit 124. The image forming unit 145 is implemented by the control FPGA 130 illustrated in FIG. 2 or by execution of a program by the control CPU 121.

The storing unit 146 is a functional unit that stores a plurality of mask patterns that are necessary for the image processing unit 141 to perform selective discharge processing. The plurality of mask patterns is described later. The storing unit 146 is implemented by a storage device such as the ROM 122 or the RAM 123 illustrated in FIG. 2.

The image processing unit 141 includes a color-specific-data-generation processing unit 151, a dot-data-generation processing unit 152, and a printing-dot selective-discharge processing unit 153.

The color-specific-data-generation processing unit 151 converts the image data (RGB data) acquired by the image acquiring unit 140 into CMYK data handled by the inkjet recording apparatus 10, to generate color-specific data for each of CMYK. The dot-data-generation processing unit 152 generates dot data that can be handled by the inkjet recording apparatus 10 based on gradation data of CMYK.

When multi-pass printing is performed, the printing-dot selective-discharge processing unit 153 determines selective discharge processing by using a mask pattern for selective discharge that determines which dots of each dot data are to be printed. The head unit 12 changes the amount of liquid discharged from the nozzle row by application of voltage to selectively discharge one or more types of droplets having different volumes, such as a large droplet, a medium droplet, a small droplet, and non-discharge.

Description of Multi-Pass Printing

Figure 4:
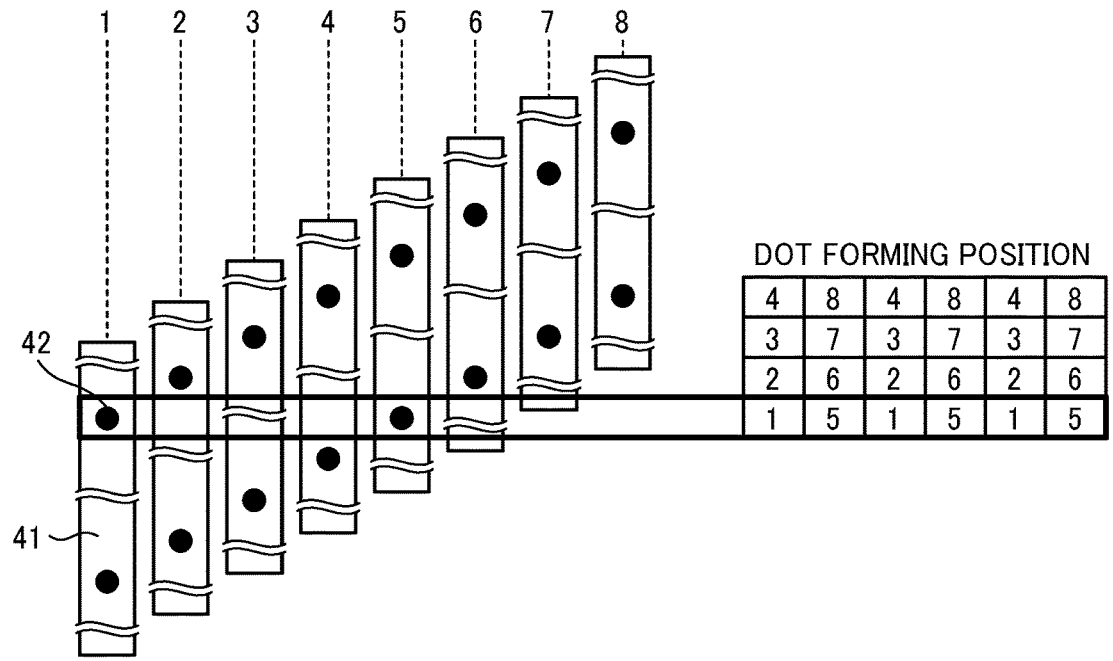
FIG. 4 is a diagram illustrating an example of multi-pass printing in a serial-type inkjet recording apparatus.
Figure 5:
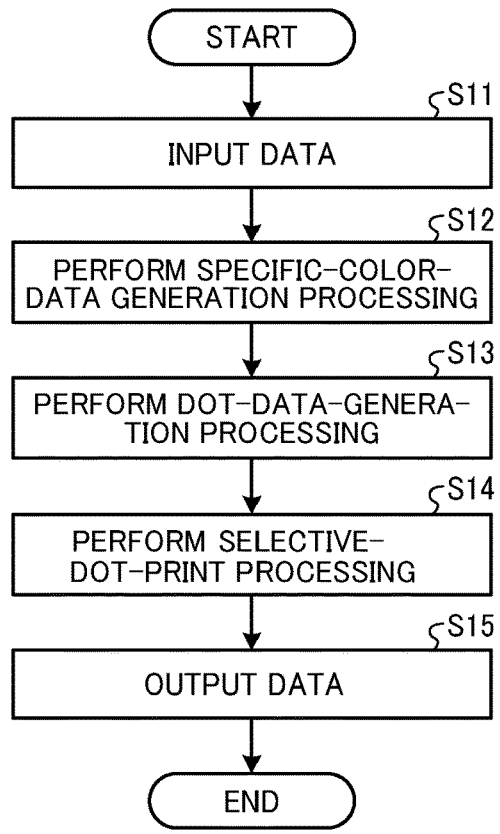
FIG. 5 is a diagram illustrating an example of a flowchart of data processing during multi-pass printing.

FIG. 4 is a diagram illustrating an example of multi-pass printing in the serial-type inkjet recording apparatus. FIG. 5 is a diagram illustrating an example of a flowchart of data processing during multi-pass printing.

As illustrated in FIG. 4, an example of multi-pass printing in the serial-type inkjet recording apparatus 10 is described below. The multi-scan printing is a printing method in which dots are arranged so as to be divided into a plurality of scans in the serial-type inkjet recording apparatus 10, and relative positions of a medium and a nozzle are shifted for each scan to form a target resolution image.

FIG. 4 is an example of a two-pass ¼-interlace operation. In the case of the two-pass ¼-interlace operation, one scanning line is formed by two scans, and the dot data of the formed scanning line is separately printed by two scans. For example, in the case of dots surrounded by the thick line in FIG. 4, nozzles 42 of the head 41 are positioned at the position of the scanning line in the first scan and the fifth scan. Accordingly, the dots to be printed in each of the first scan and the fifth scan can be separated and separately printed to complete the scanning line.

As illustrated in FIGS. 3 and 5, when data is input in step S11, in step S12 the color-specific data-generation processing unit 151 converts the image data acquired by the image acquiring unit 140 into CMYK data to be processed by the inkjet recording apparatus 10 to generate color-specific data for each color of CMYK. In step S13, the dot-data-generation processing unit 152 generates dot data for each color-specific data.

In step S14, the printing-dot selective-discharge processing unit 153 determines selective discharge processing using a mask pattern for selective discharge, which indicates which dots of dot data of each scan are to be printed in the multi-pass printing. In step S15, the head unit 12 prints (outputs) the data generated by scanning in the selective discharge processing.

Description of Selective Discharge Processing

Figure 6:
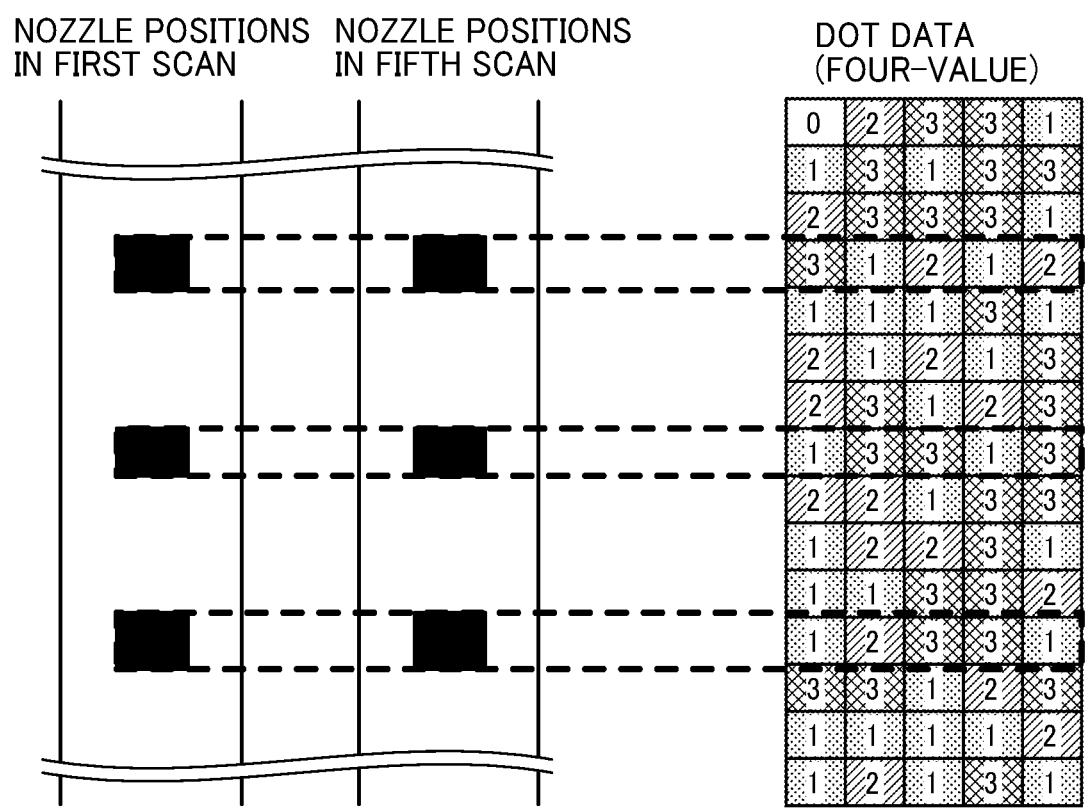
FIG. 6 is a diagram illustrating basic selective discharge processing.
Figure 7:
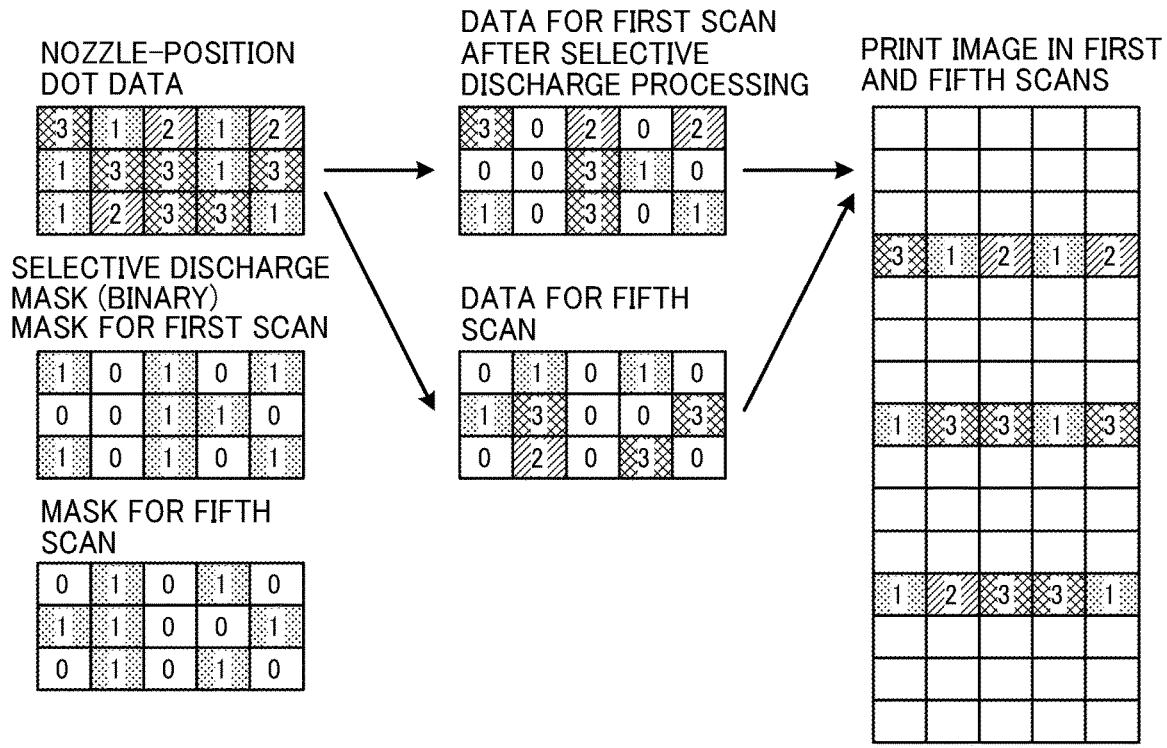
FIG. 7 is a diagram illustrating an example of two-pass ¼-interlace.

FIG. 6 is a diagram illustrating basic selective discharge processing. FIG. 7 is a diagram illustrating an example of two-pass ¼ interlace.

In the following, basic selective discharge processing is described. Here, a description is given of a case in which four values of dot data correspond to a large droplet, a medium droplet, a small droplet, and non-discharged droplet. In the selective discharge processing, data corresponding to the nozzle position at each scan is acquired from the generated dot data, and the selective discharge processing is performed on the acquired data.

As illustrated in FIG. 6, the selective discharge processing of FIG. 6 is an example of two-pass ¼-interlace, and the positions of nozzles overlap in the first scan and the fifth scan. Therefore, the selective discharge processing is performed in the first scan and the fifth scan. In FIG. 6, "0" represents no ink discharge, "1" represents a small ink droplet, "2" represents a medium ink droplet, and "3" represents a large ink droplet.

As illustrated in FIG. 7, in the selective discharge processing of FIG. 7, the mask pattern for the selective discharge processing is used to perform selective discharge in the first half scan (first scan) and the second half scan (fifth scan). Mask patterns in conventional selective discharge processing include "0" indicating that no ink is discharged and "1" indicating that ink is discharged. Conventionally, two mask patterns of "0" and "1" are used to distribute dot data to each scan. In this case, the relationship between the mask pattern of the first scan and the mask pattern of the fifth scan is complementary. In other words, two print scans are performed to form the same arrangement of dots as the arrangement of dot data.

Table 1 below represents an example of the selective discharge processing using a binary mask pattern. In this case, for example, mask processing is performed to calculate the logical product (AND) of dot data and a mask value at the corresponding position. The mask pattern is binary, and a non-discharge pixel "00" and a discharge pixel "11" are set for the non-discharge "01", the small droplet "00", the medium droplet "10", and the large droplet "11" of the dot data. Then, the logical product (AND) of the dot data and the mask pattern is calculated to determine the droplet size of ink to be output. In other words, when the mask pattern is "00", the droplet size to be output is "no discharge". When the mask pattern is "11", the small droplet "01", the medium droplet "10", and the large droplet "11" of the dot data of pixels to be discharged are output as they are.

TABLE 1

| INPUT DROPLET SIZE | DATA | MASK (BINARY) | OUTPUT DROPLET SIZE | OUTPUT DATA |
| --- | --- | --- | --- | --- |
| NONE | 00 | 00 | NONE | 0 |
|  |  | 11 | NONE | 0 |

TABLE 1-continued

| INPUT DROPLET SIZE | DATA | MASK (BINARY) | OUTPUT DROPLET SIZE | OUTPUT DATA |
|---|---|---|---|---|
| SMALL | 01 | 00 | NONE | 0 |
|  |  | 11 | SMALL | 0 |
| MEDIUM | 10 | 00 | NONE | 0 |
|  |  | 11 | MEDIUM | 0 |
| LARGE | 11 | 00 | NONE | 0 |
|  |  | 11 | LARGE | 0 |

Figure 8:
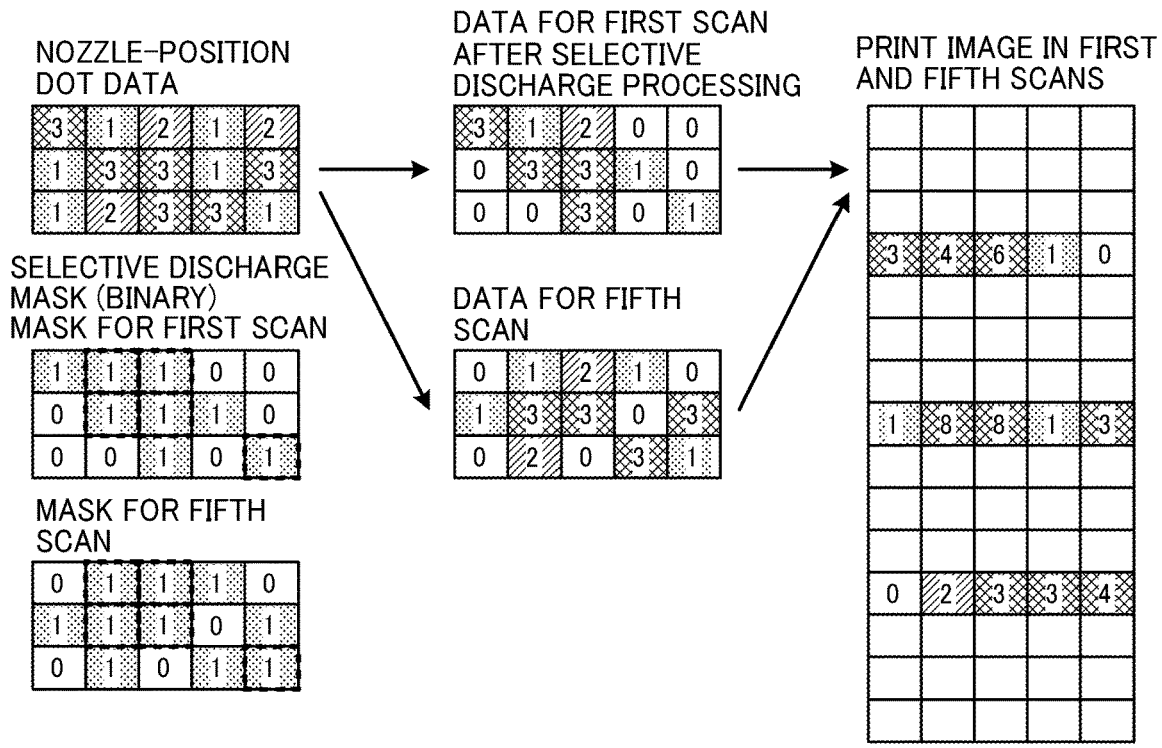
FIG. 8 is a diagram illustrating selective discharge processing in the case in which overlap void processing is performed.

FIG. 8 is a diagram illustrating selective discharge processing in the case in which overlap void processing is performed.

As illustrated in FIG. 8, the selective discharge processing of FIG. 8 is for an explanation of the selective discharge processing in the case in which the overlap void processing is performed. In order to restrain the uneven density due to the landing position deviation of ink droplets, two types of selective discharge processing, in other words, overlap processing of overlapping some dots with each other and void processing of providing a pixel in which a dot is not formed are performed. In this case, FIG. 8 depicts an example of the selective discharge processing in which the overlap processing and the void processing are combined. Here, in the overlap void processing, mask patterns of the selective discharge processing are used to perform selective discharge in the first half scan (first scan) and the second half scan (fifth scan). The mask patterns of the selective discharge processing includes "0" indicating that no ink is discharged and "1" indicating that ink is discharged.

In the selective discharge processing including the overlap processing and the void processing in FIG. 8, the mask patterns of the selective discharge processing do not have a complementary relationship of "1" to be discharged and "0" not to be discharged between the first scan and the fifth scan, and the values of some pixels of the mask pattern overlap between the first scan and the fifth scan. Dots ("1" indicated by a thick line) are formed in an overlapping manner in a pixel in which the values of the mask patterns of the selective discharge processing overlap. Alternatively, a pixel ("0" indicated by a thick line) in which no dot is formed is generated. When the overlapping void processing is performed, uneven density is less likely to occur even when landing position deviation of ink droplets occurs. In other words, in a multi-pass print image subjected to the overlap void processing, some pixels have overlapping portions "4", "6", and "8" of the same droplet types or a blank portion "0" in which no dot is formed.

Figure 9A:
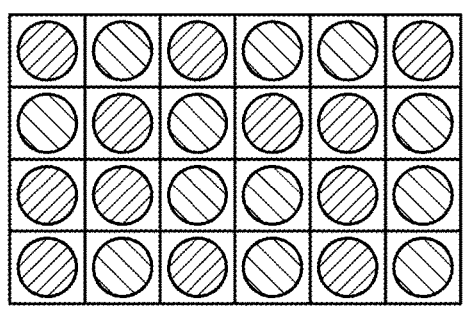
FIGS. 9A thorough 9D are diagrams illustrating the effect of overlap processing and void processing on uneven density.

FIGS. 9A thorough 9D are diagrams illustrating the effect of the overlap processing and the void processing on uneven density.

As illustrated in FIGS. 9A thorough 9D, in the selective discharge processing including the overlap processing and the void processing, selective discharge was performed in the first half scan and the second half scan, and landing deviation of ink droplets did not occur in the first half scan and landing deviation of ink droplets occurred in the second half scan. FIG. 9 illustrates dot arrangements with and without the overlap void processing.

Figure 9B:
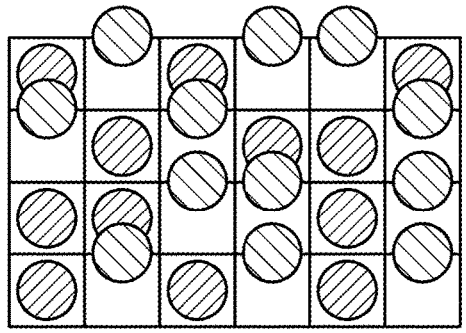
Figure 9C:
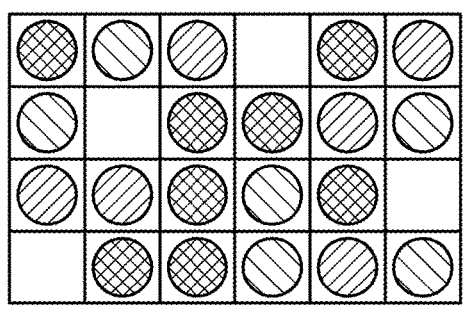
Figure 9D:
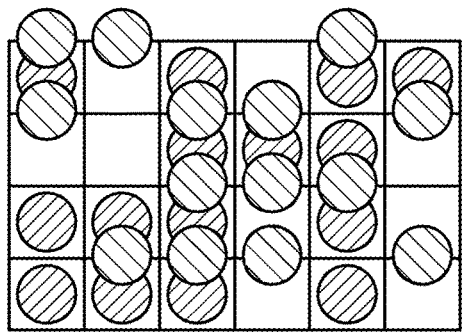

FIGS. 9A and 9B are examples of a case in which the overlap void processing is not performed. When the landing positions of ink droplets are shifted from an ideal positions illustrated in FIG. 9A, some dots of the first half scan and some dots of the second half scan overlap each other as illustrated in FIG. 9B, and unintended blanks occur, which leads to uneven density. On the other hand, FIGS. 9C and 9D are examples of the case in which the overlap void processing is performed. In the void processing, even when the ink droplets land at the ideal positions illustrated in FIG. 9C, some pixels become blank and some dots are formed to overlap each other as illustrated in FIG. 9D. In the case in which the overlap void processing is performed, when the landing positions of ink droplets are shifted, blank occurs. However, since the landing position deviation causes one side of an overlapping dot to fill the blank generated by the landing position deviation or the original blank due to the void processing, the difference in ink covering area is smaller than in the case in which no landing position deviation occurs, thus exerting an effect of restraining uneven density.

Figure 10:
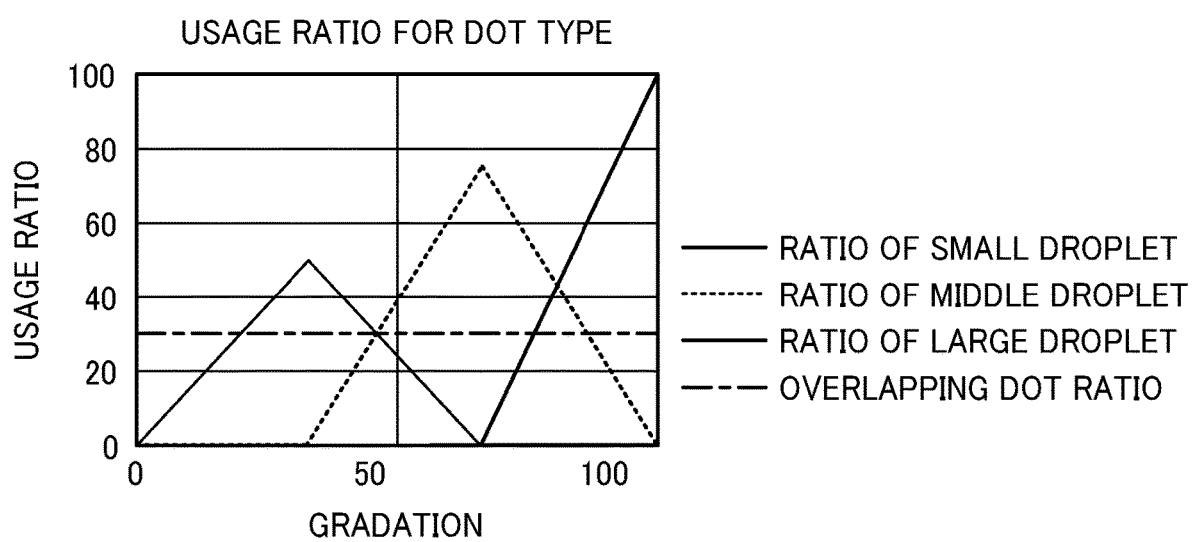
FIG. 10 is a graph illustrating overlapping dot ratio with respect to gradation.

FIG. 10 is a graph illustrating the overlap ratio with respect to the gradation. FIGS. 11A, 11B, 11C, and 11D are diagrams illustrating examples of dot arrangement in occurrence of landing deviation in a low gradation portion when the overlap processing is performed and when the overlap processing is not performed.

As illustrated in FIG. 10, the graph represents the ratio of each used droplet and the overlapping rate of dots in the gradation of image data. Here, the solid line represents the large droplet ratio, the dotted line represents the medium droplet ratio, the thin line represents the small droplet ratio, and the alternate long and short dash line represents the overlapping dot ratio. In comparative overlap void processing, for example, the values of some pixels of mask patterns for selective discharge processing were overlapped with each other to perform overlap processing. Therefore, the overlapping dot ratio was constant with respect to the gradation regardless of the droplet type and gradation. In the inkjet recording apparatus 10 including the droplet types of a plurality of sizes, usually, small droplets are mainly used in a low gradation region. In addition, the number of dots used is small, and the coverage of dots on data is low.

Figure 11A:
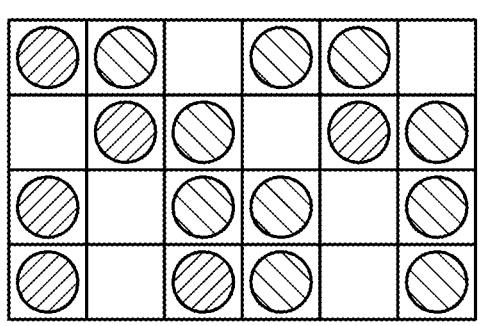
FIGS. 11A, 11B, 11C, and 11D are diagrams illustrating examples of dot arrangement in occurrence of landing deviation in a low gradation portion when the overlap processing is performed and when the overlap processing is not performed.

As illustrated in FIGS. 11A thorough 11D, in selective discharge processing including overlap processing and void processing, selective discharge was performed in the first half scan and the second half scan, and landing deviation of ink droplets did not occur in the first half scan and landing deviation of ink droplets occurred in the second half scan. FIG. 11 illustrates examples of dot arrangements with and without the overlap void processing in a low gradation portion at this time.

Figure 11B:
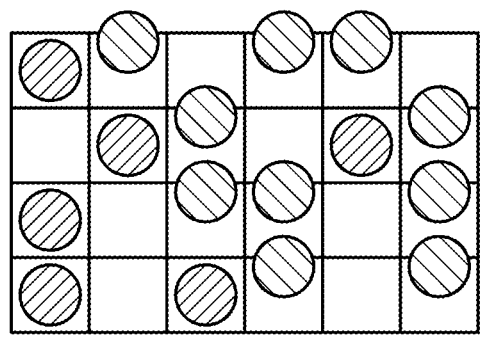
Figure 11C:
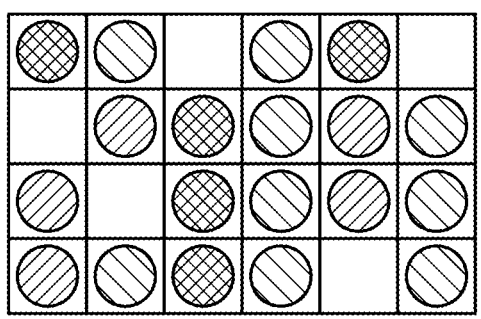
Figure 11D:
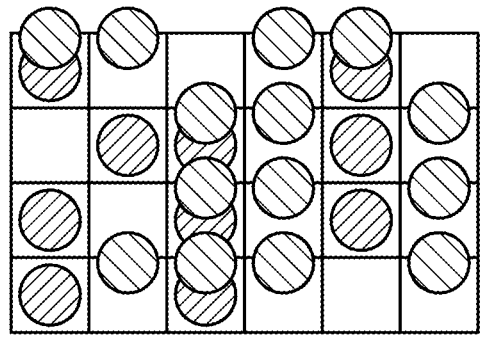

FIGS. 11A and 11B depict examples of a case in which the overlap void processing is not performed. In the low gradation portion, the original dot coverage is low and ink droplets of a small size are used. Accordingly, in a case in which the landing positions are shifted from the ideal positions illustrated in FIG. 11A, overlapping of dots is less likely to occur as illustrated in FIG. 11B and uneven density is less likely to occur. On the other hand, FIGS. 11C and 11D depict examples of a case in which the overlap void processing is performed. The positions of dots are shifted due to the shift of the positions of overlapping dots from the ideal positions illustrated in FIG. 11C in the low gradation portion. As illustrated in FIG. 11D, the ink covering area on one pixel becomes large, which may cause deterioration in graininess.

Description of Selective Discharge Processing of First Embodiment

Figure 12:
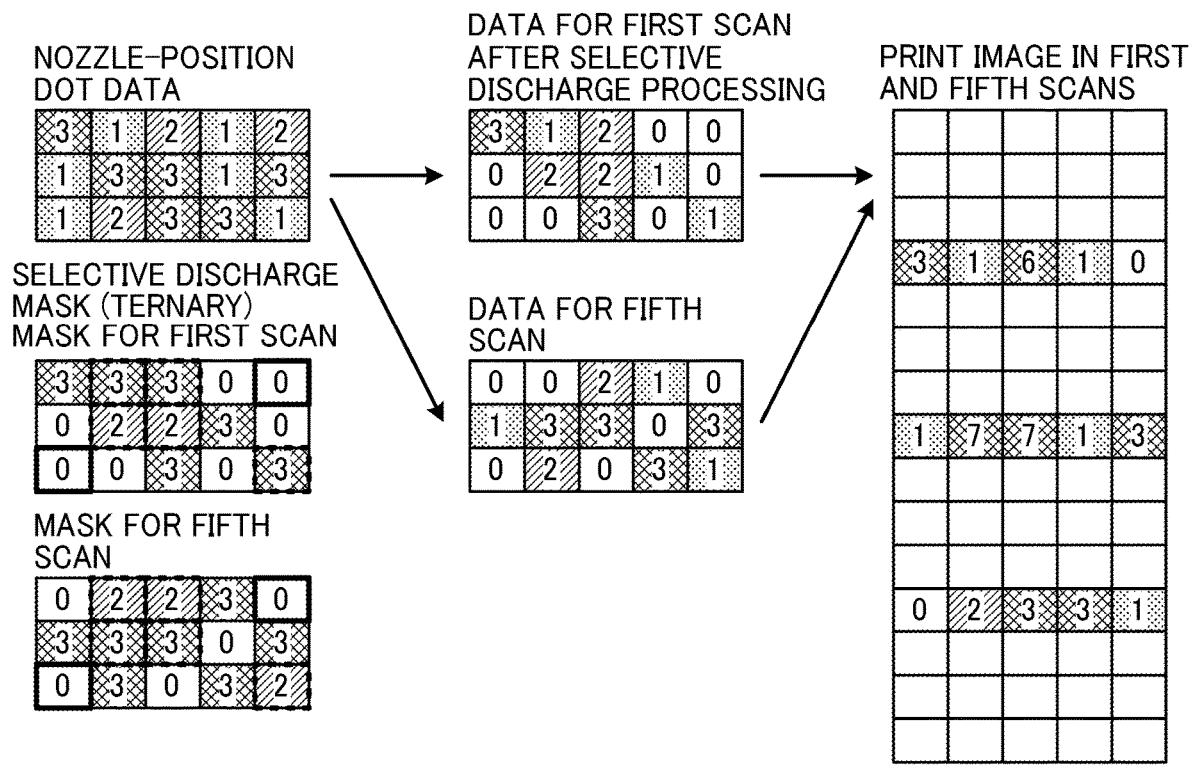
FIG. 12 is a diagram illustrating an example of overlap void processing according to the first embodiment.
Figure 13:
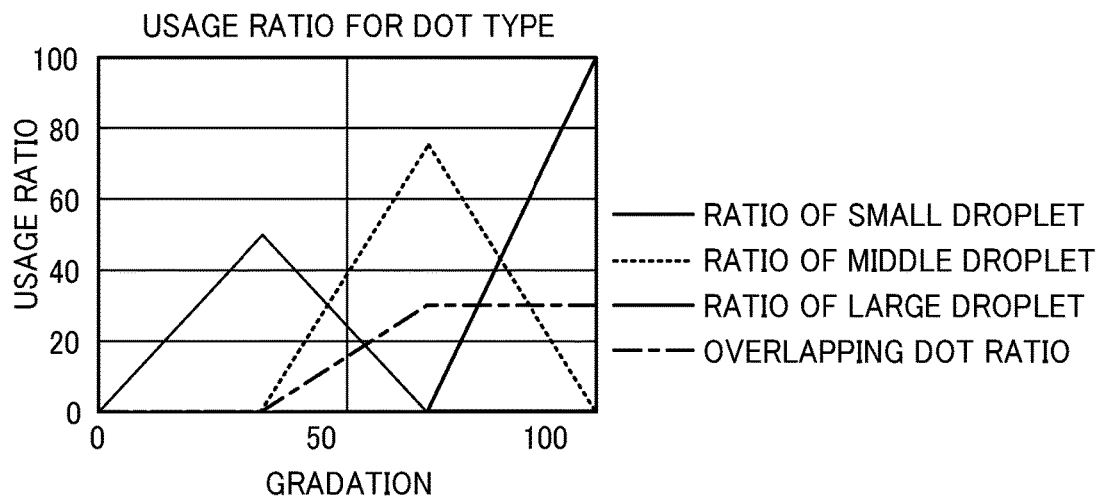
FIG. 13 is a graph illustrating overlapping dot ratio with respect to gradation in the overlap void processing according to the first embodiment.

FIG. 12 is a diagram illustrating an example of the overlap void processing of the first embodiment. FIG. 13 is a graph illustrating the overlapping dot ratio with respect to the gradation in the overlap void processing of the first embodiment.

As illustrated in FIG. 3, the inkjet recording apparatus 10 according to the first embodiment includes the head unit 12, the conveyance stage 13, the image acquiring unit 140, the storing unit 146, and the image processing unit 141. The storing unit 146 stores a plurality of mask patterns capable of changing the discharge amount and the discharge size of ink droplets from the head unit 12 of the inkjet recording apparatus 10. The plurality of mask patterns stored in the storing unit 146 includes a first mask pattern for not discharging ink droplets, a second mask pattern for discharging ink droplets without changing the discharge size of ink droplets, and a third mask pattern for discharging ink droplets with changing the discharge size of ink droplets.

The image processing unit 141 creates dot data from image data and determines the size of ink droplets to be discharged based on the dot data and the mask pattern stored in the storing unit 146. At this time, the image processing unit 141 selects one mask pattern from three mask patterns and converts the dot data to be printed by the selected mask patterns. Specifically, the processing by the image processing unit 141 is performed by calculating the logical product of the dot data and the mask pattern.

The liquid discharge method according to the first embodiment includes the steps of moving at least one of the recording medium 14 and the head unit 12 to scan the recording medium 14, acquiring image data, creating dot data from the image data, selecting one of a first mask pattern for not discharging liquid (e.g., ink) from the head unit 12 based on the dot data, a second mask pattern for discharging liquid without changing the discharge size of liquid from the head unit 12, and a third mask pattern for discharging liquid with changing the discharge size of ink from the head unit 12, and determining the size of liquid discharged from the head unit 12 based on the dot data and the selected mask pattern.

A storage medium according to the first embodiment stores program code that causes the inkjet recording apparatus 10 to execute the plurality of steps described above.

As illustrated in FIG. 12, the selective discharge processing of FIG. 12 is for an explanation of the selective discharge processing in the case in which the overlap void processing of the first embodiment is performed. In this case, FIG. 12 depicts an example of the selective discharge processing in which the overlap processing and the void processing are combined. Here, in the overlap void processing, mask patterns of the selective discharge processing are used to perform selective discharge in the first half scan (first scan) and the second half scan (fifth scan). The mask pattern for the selective discharge processing is multi-valued (three-valued) larger than two-valued, thus allowing the overlapping ratio to be changed for each droplet type. In other words, the overlap void processing is performed when the mask pattern processing is performed by calculating the logical product of the dot data and the three-valued mask pattern. In other words, "0" indicates that no ink is discharged, "2" indicates that a medium or large droplet of ink is discharged, and "3" indicates that ink is discharged.

In the overlap void processing of FIG. 12, among the pixels of mask patterns in which values of the overlap void processing overlap, the pixels of any one of the first half scan and the second half scan are set to different values. Thus, the overlap void processing can be changed in accordance with the droplet type of the dot data. In other words, in the mask patterns for the selective discharge processing, "0" indicating no droplet discharge, "2" indicating discharge of ink of a medium droplet or a large droplet, and "3" indicating discharge of ink are in a complementary relationship between the first scan and the fifth scan, and the values of some pixels of the mask patterns overlap.

Table 2 below represents an example of the selective discharge processing using three-valued mask patterns. In this case, for example, mask processing is performed to calculate the logical product (AND) of dot data and a mask value at the corresponding position. The mask pattern has three-values, and a pixel "00" that is not to be discharged, a pixel "10" that is to be discharged or that limits the discharge amount, and a pixel "11" that is to be discharged are set for the non-discharge "01", the small droplet "00", the medium droplet "10", and the large droplet "11" of the dot data. Then, the logical product (AND) of the dot data and the mask pattern is calculated to determine the droplet size of ink to be output. In other words, when the mask pattern is "00" for the small droplet "01", the medium droplet "10", and the large droplet "11", the droplet size to be output is "no discharge". When the mask pattern is "10" for the small droplet "01", the droplet size to be output is "no discharge". When the mask pattern is "10" for the medium droplet "10", the droplet size to be output is the medium droplet "10". When the mask pattern is "10" for the large droplet "11", the droplet size to be output is the medium droplet "10". In addition, in a case in which the mask pattern is "11" for the small droplet "01", the medium droplet "10", and the large droplet "11", the small droplet "01", the medium droplet "10", and the large droplet "11" of the dot data of pixels to be discharged are output as they are.

TABLE 2

| INPUT DROPLET SIZE | DATA | MASK (BINARY) | OUTPUT DROPLET SIZE | OUTPUT DATA |
|---|---|---|---|---|
| NONE | 00 | 00 | NONE | 0 |
|  |  | 10 | NONE | 0 |
|  |  | 11 | NONE | 0 |
| SMALL | 01 | 00 | NONE | 0 |
|  |  | 10 | NONE | 0 |
|  |  | 11 | SMALL | 0 |
| MEDIUM | 10 | 00 | NONE | 0 |
|  |  | 10 | MEDIUM | 0 |
|  |  | 11 | MEDIUM | 0 |
| LARGE | 11 | 00 | NONE | 0 |
|  |  | 10 | MEDIUM | 0 |
|  |  | 11 | LARGE | 0 |

As illustrated in FIG. 13, the graph represents the ratio of each used droplet and the overlapping dot ratio in the gradation of image data. Here, the solid line represents the large droplet ratio, the dotted line represents the medium droplet ratio, the thin line represents the small droplet ratio, and the alternate long and short dash line represents the overlapping dot ratio. In the overlap void processing according to the first embodiment, the values of some pixels of mask patterns for selective discharge processing were overlapped with each other to perform overlap processing. In addition, the execution of the overlap processing is in accordance with the droplet size of ink. For example, the overlap processing is not performed on dot data of a small droplet size, and the overlap processing is performed only on dot data of a medium droplet size and dot data of a large droplet size. Therefore, the overlapping dot ratio is changed with respect to the gradation in accordance with the droplet type and gradation. In other words, since the overlap processing is not performed on the dots of the small droplet size, the overlap processing for restraining uneven density from middle gradation to high gradation can be performed without deteriorating the graininess on the low gradation side in which the usage ratio of the dots of the small droplet size is high.

Figure 14:
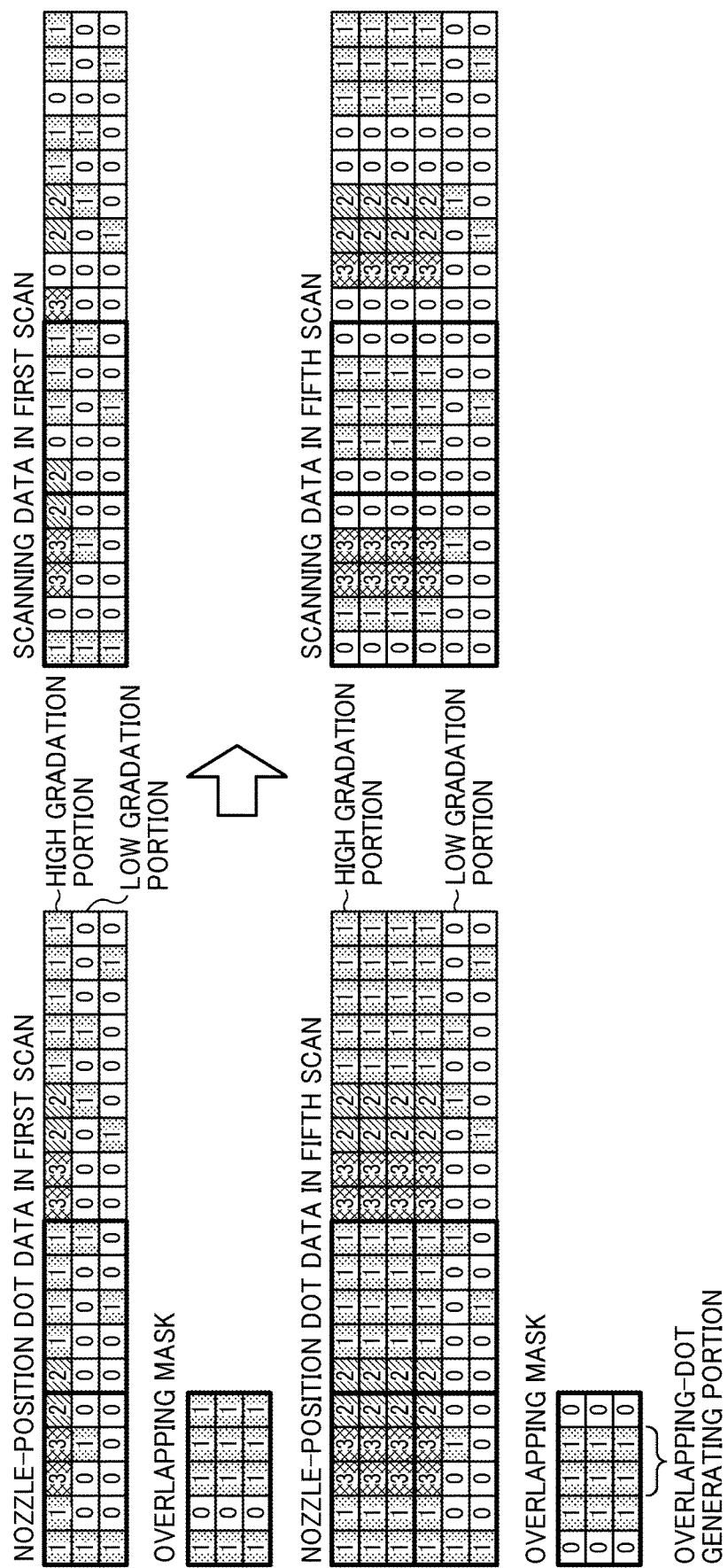
FIG. 14 is a diagram illustrating a comparative example of specific overlap void processing.
Figure 15:
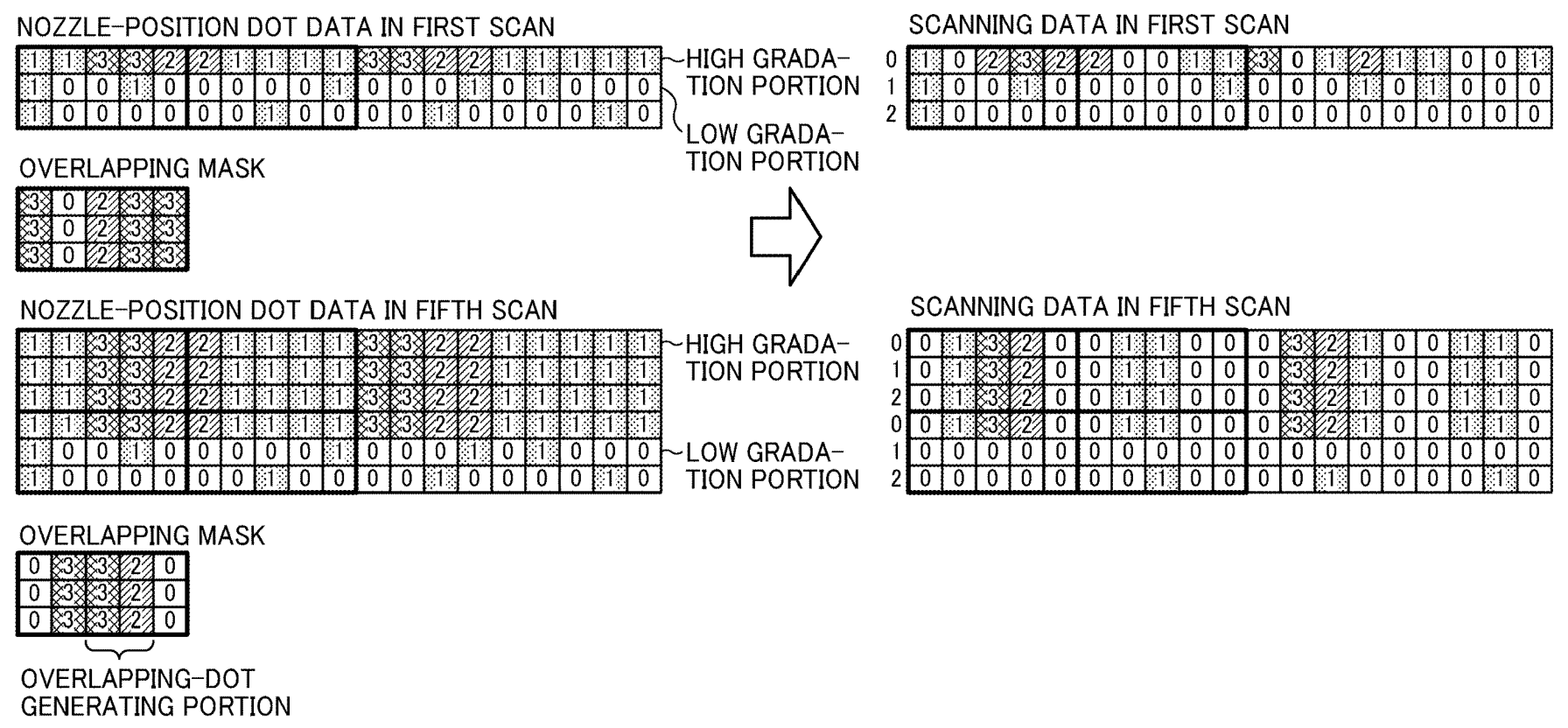

FIG. 14 is a diagram illustrating a comparative specific overlap void processing. FIG. 15 is a diagram illustrating specific overlap void processing of the first embodiment.

As illustrated in FIG. 14, a comparative example of overlap void processing has binary (two-valued) mask patterns. In the binary mask pattern, a pixel "00" not to be discharged and a pixel "11" to be discharged are set for the dot data. The mask processing calculates the logical product (AND) of the dot data and the mask value. On the other hand, as illustrated in FIG. 15, the overlap void processing of the first embodiment has three-valued mask patterns. In the three-valued mask pattern, a pixel "00" that discharges no droplet, a pixel "10" that discharges a large droplet and a medium droplet as medium droplets without discharging a small droplet, and a pixel "11" that discharges a droplet are set for dot data. The mask processing calculates the logical product (AND) of the dot data and the mask value.

Description of Selective Discharge Processing of Second Embodiment

Figure 16:
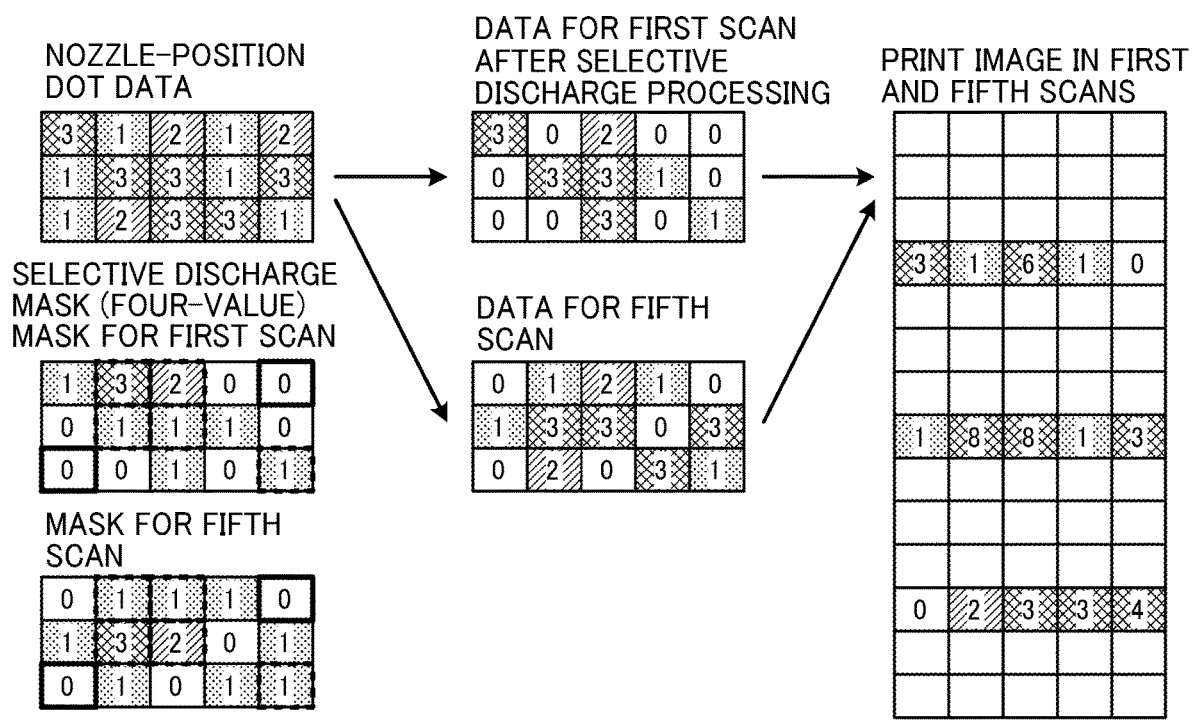
FIG. 16 is a diagram illustrating an example of overlap void processing according to a second embodiment.

FIG. 16 is a diagram illustrating an example of overlap void processing according to a second embodiment.

As illustrated in FIG. 16, the selective discharge processing of FIG. 16 is for an explanation of the selective discharge processing in the case in which the overlap void processing of the second embodiment is performed. In this case, FIG. 16 depicts an example of the selective discharge processing in which the overlap processing and the void processing are combined. In the overlap void processing of FIG. 16, the mask pattern for the selective discharge processing is four-valued, and the selective discharge processing is performed by selecting an output dot according to the value of a mask instead of the logical product in the mask processing.

In the overlap void processing of the second embodiment, as in the first embodiment, the execution of the overlap processing is restricted according to the droplet size of ink. In other words, the overlap processing is not performed on dot data of a small droplet size, and the overlap processing is performed only on dot data of a medium droplet size and dot data of a large droplet size. Therefore, the overlapping dot ratio is changed with respect to the gradation in accordance with the droplet type and gradation. In other words, since the overlap processing is not performed on the dots of the small droplet size, the overlap processing for restraining uneven density from middle gradation to high gradation can be performed without deteriorating the graininess on the low gradation side in which the usage ratio of the dots of the small droplet size is high.

Description of Operation and Effect of Present Embodiment

As described above, the inkjet recording apparatus 10 according to the present embodiment includes the head unit 12 that discharges ink from a plurality of nozzles onto the recording medium 14, the conveyance stage 13 on which the recording medium 14 is scanned, the image acquiring unit 140 that acquires image data, the storing unit 146 that stores a plurality of mask patterns that can change the amount and size of ink discharged from the head unit 12, and the image processing unit 141 that creates dot data from the image data and determines the size of ink discharged from the head unit 12 based on the dot data and the mask patterns. Therefore, the image processing unit 141 determines the size of ink by using the mask patterns capable of changing the discharge amount and the discharge size of ink, thus allowing further enhancement of image quality.

In the inkjet recording apparatus 10 according to the present embodiment, the storing unit 146 stores a first mask pattern in which liquid (e.g., ink) is not discharged from the head unit 12, a second mask pattern in which liquid is discharged without changing the discharge size of the liquid from the head unit 12, and a third mask pattern in which liquid is discharged with changing the discharge size of the liquid from the head unit 12. The process is completed only with the dot data and the mask patterns for the selective discharge processing. Accordingly, it is not necessary to create various data for each droplet type in order to change the overlapping ratio in accordance with the image, and the process can be easily performed.

In the inkjet recording apparatus 10 according to the present embodiment, the image processing unit 141 converts dot data to be printed using mask patterns. In other words, the image processing unit 141 changes the size of dot data to be output by calculating the logical product of the dot data and the mask pattern. The image processing unit 141 changes the size of dot data to be output in accordance with the value of the mask pattern. Thus, the overlap processing can be easily performed.

The liquid discharge method according to the present embodiment includes the steps of scanning the recording medium 14, acquiring image data, creating dot data from the image data, selecting one of a first mask pattern for not discharging ink from the head unit 12 based on the dot data, a second mask pattern for discharging ink without changing the discharge size of ink from the head unit 12, and a third mask pattern for discharging ink with changing the discharge size of ink from the head unit 12, and determining the size of ink discharged from the head unit 12 based on the dot data and the selected mask pattern.

A program of the liquid discharge method according to the present embodiment is for causing the head unit 12 to execute each of the steps described above. Therefore, the image quality can be further enhanced.

In addition, in the above-described embodiments, the example in which the liquid discharge apparatus according to an embodiment of the present disclosure is applied to an inkjet recording apparatus. However, the liquid discharge apparatus according to an embodiment of the present disclosure can be applied to any of a multifunction peripheral, a printer, a scanner device, a facsimile device, and the like.

In addition, in the above-described embodiments, examples of the recording medium include, but are not limited to, paper sheet, a recording sheet, a film, cloth, an electronic component (e.g., electronic board, piezoelectric element), a powder layer, an organ model, and a test cell. The recording medium may be any substance on which liquid can adhere. The material of the recording medium may be paper, thread, fiber, fabric, leather, metal, plastic, glass, wood, ceramics, or the like, as long as the liquid can adhere even temporarily.

In addition, the liquid may be any liquid having a viscosity and a surface tension capable of being discharged from the liquid discharge head. Examples of the liquid include an inkjet ink, a surface treatment liquid, a liquid for forming a constituent element of an electronic element or a light emitting element, a liquid for forming a resist pattern of an electronic circuit, and a three-dimensional fabricating material liquid.

Further, each of the functions of the described embodiments may be implemented by one or more processing circuits or circuitry. Here, the processing circuit or circuitry in the present specification includes a programmed processor to execute each function by software, such as a processor implemented by an electronic circuit, and devices, such as an application specific integrated circuit (ASIC), a digital signal processors (DSP), a field programmable gate array (FPGA), a system on a chip (SOC), a graphics processing unit (GPU), and conventional circuit modules arranged to perform the recited functions.

In the above-described embodiments, when at least one of the functional units of the inkjet recording apparatus 10 is implemented by execution of a program, the program is provided, for example, by being incorporated in a ROM or the like in advance. In the above-described embodiments and modifications, the program executed by the inkjet recording apparatus 10 may be provided by being recorded in a computer-readable recording medium such as a compact disc read only memory (CD-ROM), a flexible disk (FD), a compact disk-recordable (CD-R), or a digital versatile disc (DVD) in a file of an installable format or an executable format.

In the above-described embodiments, the program executed by the inkjet recording apparatus 10 may be stored in a computer connected to a network such as the Internet and may be provided by being downloaded via the network. In the above-described embodiments and modifications, the program executed by the inkjet recording apparatus 10 may be provided or distributed via a network such as the Internet. In the above-described embodiments and modifications, the program executed by the inkjet recording apparatus 10 has a module configuration including at least one of the above-described functional units. As actual hardware, the CPU reads the program from the above-described storage device and executes the program, so that the above-described functional units are loaded and generated on the main storage device.

The invention claimed is:

1. A liquid discharge apparatus comprising:
   a liquid discharge head configured to discharge liquid from a plurality of nozzles onto a recording medium;
   a scanning device configured to move at least one of the recording medium and the liquid discharge head to perform scanning;
   a storage device configured to store a plurality of mask patterns to change a discharge amount and a discharge size of the liquid from the liquid discharge head; and
   circuitry configured to:
      acquire image data;
      create dot data from the image data and determine the discharge size of the liquid to be discharged from the liquid discharge head, based on the dot data and one of the plurality of mask patterns; and
      calculate a logical product of input droplet size recited in the dot data and any one of the plurality of mask patterns to change a size of dot data to be output.

2. The liquid discharge apparatus according to claim 1, wherein the storage device is configured to store a first mask pattern for discharging no liquid from the liquid discharge head, a second mask pattern for discharging the liquid without changing the discharge size of the liquid from the liquid discharge head, and a third mask pattern for discharging the liquid with changing the discharge size of the liquid from the liquid discharge head.

3. The liquid discharge apparatus according to claim 1, wherein the circuitry is configured to convert dot data to be printed according to the plurality of mask patterns.

4. The liquid discharge apparatus according to claim 1, wherein the circuitry is configured to change a size of dot data to be output, according to a value of the plurality of mask patterns.

5. A liquid discharge method comprising:
   moving at least one of a recording medium and a liquid discharge head to perform scanning;
   acquiring image data;
   creating dot data from the image data;
   selecting one of a first mask pattern for discharging no liquid from the liquid discharge head based on the dot data, a second mask pattern for discharging the liquid without changing a discharge size of the liquid from the liquid discharge head, and a third mask pattern for discharging the liquid with changing the discharge size of the liquid from the liquid discharge head;
   determining the discharge size of the liquid to be discharged from the liquid discharge head based on the dot data and the one of the first mask pattern, the second mask pattern, and the third mask pattern selected by the selecting; and
   calculating a logical product of input droplet size recited in the dot data and any one of the plurality of mask patterns to change a size of dot data to be output.

6. A non-transitory storage medium storing computer-readable program code for causing a liquid discharge apparatus to execute:
   moving at least one of a recording medium and a liquid discharge head to perform scanning;
   acquiring image data;
   creating dot data from the image data;
   selecting one of a first mask pattern for discharging no liquid from the liquid discharge head based on the dot data, a second mask pattern for discharging the liquid without changing a discharge size of the liquid from the liquid discharge head, and a third mask pattern for discharging the liquid with changing the discharge size of the liquid from the liquid discharge head;
   determining the discharge size of the liquid to be discharged from the liquid discharge head based on the dot data and the one of the first mask pattern, the second mask pattern, and the third mask pattern selected by the selecting; and
   calculating a logical product of input droplet size recited in the dot data and any one of the plurality of mask patterns to change a size of dot data to be output.

* * * * *